United States Patent [19]
Fox et al.

[11] Patent Number: 5,261,050
[45] Date of Patent: Nov. 9, 1993

[54] APPARATUS FOR PROCESSING A DIGITAL IMAGE FOR WINDOW WIDTH, LEVEL AND CURVE SHAPE

[75] Inventors: Jason P. Fox; Robert T. Krogstad, both of Rochester; Edward P. Lawler, Fairport; Timothy J. Wojcik, Rochester, all of N.Y.

[73] Assignee: Eastman Kodak Company, Rochester, N.Y.

[21] Appl. No.: 559,102

[22] Filed: Jul. 27, 1990

[51] Int. Cl.$^5$ .................................................. G06F 15/68
[52] U.S. Cl. ..................................... 395/166; 395/164; 395/128
[58] Field of Search ............. 364/518, 519, 521; 340/747, 750; 395/162, 164, 165, 166, 128

Primary Examiner—Phu K. Nguyen
Attorney, Agent, or Firm—William F. Noval

[57] ABSTRACT

Apparatus for processing a digital image from a medical diagnostic imaging device. The apparatus includes an image memory, a configurable window width/level or combined window width/level and curve shape look-up table in the input data path to the memory and a curve shape look-up table in the output data path from the memory. The look-up tables and the image memory can handle digital images of different bit length through software control. This increases image processing versatility, minimizes image memory size, and reduces image transfer time.

18 Claims, 5 Drawing Sheets

APPARATUS FOR PROCESSING A DIGITAL IMAGE FOR WINDOW WIDTH, LEVEL AND CURVE SHAPE

BACKGROUND OF THE INVENTION

1. Technical Field of the Invention

In general, the present invention relates to apparatus for processing a digital image from a medical diagnostic imaging device. More particularly, the present invention relates to apparatus for processing digital images, which may be of different bit lengths, by means of a window width/level look-up table and a curve shape look-up table, respectively, in the input and output data paths of a buffer image memory.

2. Background Art

In printing a hard copy from a digital image displayed on a video display device, it is desirable to process the digital image so that the hard copy image matches the appearance of the displayed image. Image processing is generally effected with a look-up table which is loaded with an appropriate image transfer function. An input pixel digital value is applied to the look-up table as an address and the output pixel digital value is supplied as the processed pixel digital value. Because the tone scale characteristics of a video display monitor are generally different from the tone scale characteristics of hard copy material (such as photosensitive film), a transfer characteristic which has a non-linear curve shape (such as illustrated in FIG. 1) is used. The following patents disclose the use of look-up tables to correct tone scale: U.S. Pat. No. 4,473,849, issued Sep. 25, 1984, inventor J. K. Cool; U.S. Pat. No. 4,794,460, issued Dec. 27, 1988, inventor K. Schiota; and U.S. Pat. No. 4,730,214, issued Mar. 8, 1988, inventors T. W. Lambert et al. The latter patent discloses a technique for developing a set of calibration data which can be stored in a look-up table to effect a match between an image displayed on a video monitor and a hard copy reproduction of that image on film. Generally, to prevent contouring of the transformed digital image, the output pixel value from the look-up table includes more bits than the input pixel digital value. For example, for an 8-bit input pixel, it is common to supply a 12-bit output pixel. Thus, an image memory used to buffer a digital image prior to printing must be able to store 12-bit pixels.

Modern medical diagnostic imaging includes the production of images, which are digitized, by various well-known imaging modalities such as ultrasound, magnetic resonance imaging (MRI), nuclear medicine, computed tomography (CT), digital subtraction angiography (DSA), and digital radiography. Such digital images are displayed on a video monitor. The technique of window processing was developed to improve the diagnosis of a region of interest in a diagnostic image. Because the tonal range of a region of interest may be small compared to the tonal range of the entire digital image, insufficient contrast in the region of interest may inhibit proper diagnosis. By expanding the tonal range in the region of interest to the entire tonal range of the display device through windowing, image contrast in the region of interest is greatly enhanced. Proper diagnosis is therefore greatly facilitated. The "window width" is the range of code values in the input digital image which is displayed over the full tonal range of the output display device. The "window level" defines the location of the window within the tonal range of the entire digital image. The window level may equal the minimum or center value of the window.

Typically, a digital image from a medical diagnostic imaging modality is processed for window width and level by means of a window width/level look-up table. Patents disclosing the use of window width/level processing in digital imaging devices include: U.S. Pat. No. 4,755,954, issued Jul. 5, 1988, inventor Z. Netter; U.S. Pat. No. 4,688,175, issued Aug. 18, 1987, inventors M. Kaneko et al.; U.S. Pat. No. 4,833,625, issued May 23, 1989, inventors H. D. Fisher et al.; U.S. Pat. No. 4,399,509, issued Aug. 16, 1983, inventor G. N. Hounsfield; and U.S. Pat. Nos. 4,680,628, issued Jul. 14, 1987, inventors D. R. Wojcik et al. and 4,730,212, issued Mar. 8, 1988, inventors D. R. Wojcik et al.

In a known laser printer for producing an image on film of an image from a medical diagnostic imaging modality, curve shape, window width and window level image processing have been combined into a single look-up table. This is illustrated in FIG. 3. A digital image signal from an image source 4 (such as a medical diagnostic imaging modality), is supplied to window width/level and curve shape look-up table (LUT) 6. The output from LUT 6 is stored in buffer image memory 8. Typically, the digital image from image source 4 may comprise an 8-bit digital signal while the output of LUT 6 is a 12-bit digital signal. Thus, a greater number of bits needs to be stored in memory, resulting in an increase in the size of the buffer image memory, and consequently, in an increase in the manufacturing cost. Moreover, combining the curve shape and window level image processing into a single look-up table is disadvantageous when several images are printed on a single page of film. Generally, curve shape processing is constant for all of the images on a page, whereas window width/level processing is specific to an image and therefore can change within a page. Thus, undesirable rapid changing of the window width/level image processing LUT would be required during printing of the film.

Because different medical diagnostic imaging modalities produce images having pixels of different bit lengths (such as 8-bit or 12-bit pixels), it is desirable that both image processing look-up tables and buffer image memory have the capability of handling, in the most efficient manner, digital images having pixels of different bit lengths. Typically, the image processing look-up table and buffer image memory are sized to handle a digital image having pixels with the greatest bit lengths to be processed. When digital images with fewer bit pixels are handled, this results in a waste of both look-up table space and image memory space with a resultant waste of manufacturing cost.

SUMMARY OF THE INVENTION

According to the present invention, there is provided improved apparatus for processing a digital image for window width/level and curve shape and for storing the image before production as a hard copy.

According to one aspect of the present invention, digital image processing apparatus includes a first, window width/level, processing means for receiving an n-bit digital image signal and for adjusting the window width and level of the n-bit digital image signal to produce an n-bit windowed signal. The apparatus includes a buffer image memory which stores the n-bit windowed digital image. According to a further aspect of the present invention, the digital image processing apparatus includes a second, curve shape, image processing means for transforming an n-bit, windowed, digital image signal received from the image memory, to an m-bit digital image signal, where m is greater than n. By performing the window width/level processing with a separate processing means and storing the windowed digital signal, a smaller image memory may be employed. Furthermore, while the window width/level processing may change for each image, but the curve shape processing may be fixed for a multi-image page, the window width/level processing may be easily changed without altering the curve shape processing.

According to a feature of the present invention, the window width/level processing is effected by means of a first look-up table in the input data path to the image memory and the curve shape image processing is effected by a second look-up table in the output data path from the image memory.

According to another feature of the present invention, the first look-up table may be configured to include a combined window width/level and curve shape look-up table. In such case, the second look-up table is not used.

According to another aspect of the present invention, the input look-up table for processing a digital image and the image buffer memory are configurable, under software control, to handle digital images having pixels of different bit length, without changing processor hardware. When digital images having fewer bit pixels are processed, higher performance can be achieved and data transfer rates can be increased by handling multiple pixels simultaneously.

BRIEF DESCRIPTION OF THE DRAWINGS

In the detailed description of the invention presented below, reference is made to the accompanying drawings in which like elements are numbered with like numbers.

DESCRIPTION OF THE PREFERRED EMBODIMENTS

Figure 1:
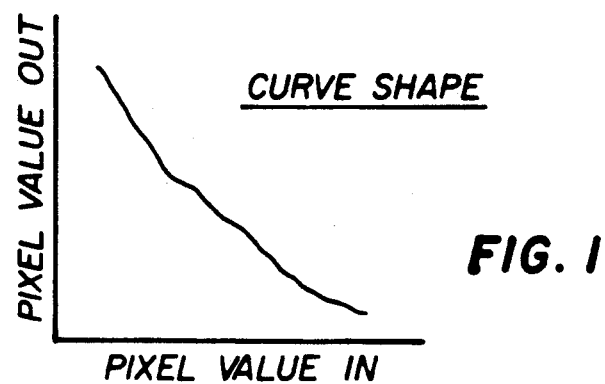
FIG. 1 is a graph showing curve shape image processing of a digital image.

Referring now to FIG. 1, there is shown laser printer apparatus incorporating an embodiment of the present invention. Although the present invention will be described below with respect to a laser printer used in medical diagnostic imaging applications, it will be understood that the image processing techniques of the present invention are applicable to other image processing applications. The apparatus shown in FIG. 4 includes a laser printer 10 for producing a film hard copy of a digital image from medical diagnostic image sources 12 and 14. Image sources 12 and 14 may comprise well known medical diagnostic imaging modalities using ultrasound, magnetic resonance imaging, nuclear medicine, computed tomography, digital subtraction angiography, digital radiography, or the like.

The images produced by image sources 12 and 14 are supplied to interfaces 16. Interfaces 16 process either analog or digital signals received from sources 12 and 14 into a digital signal which is supplied to VME bus 18. The VME bus is an Institute of Electrical and Electronic Engineers (IEEE) industrial standard communications protocol and is described in detail in the VME bus specification available from the Motorola Company.

According to an embodiment of the present invention, a first circuit board 20 includes window width/level look-up table (LUT) 22 and image memory 24. A second circuit board 26 includes curve shape look-up table 28 and image size processing circuit 30. Window width/level LUT 22 expands the tonal (contrast) range of a region of interest of an input digital image to include the complete tonal range of a display device of the image source.

LUT 22 is software configurable as either four window width/level look-up tables or two combined window width/level and curve shape look-up tables. In the former case, this allows processing of up to four 8-bit pixels in parallel, or in the latter case up to two 12-bit pixels in parallel.

Figure 2:
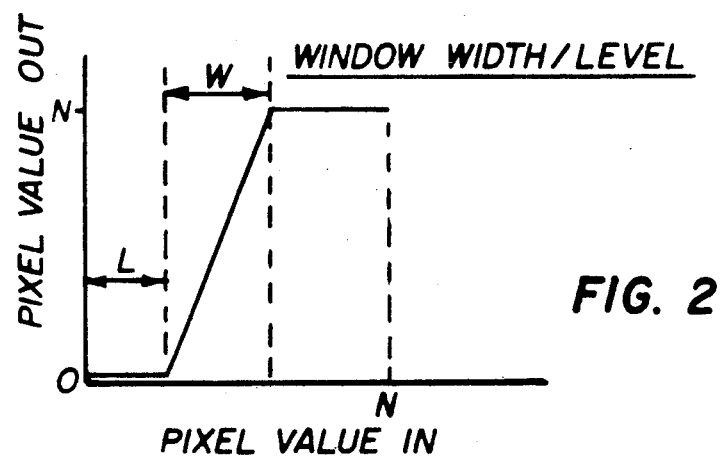
FIG. 2 is a graph showing window width/level image processing of a digital image.
Figure 3:
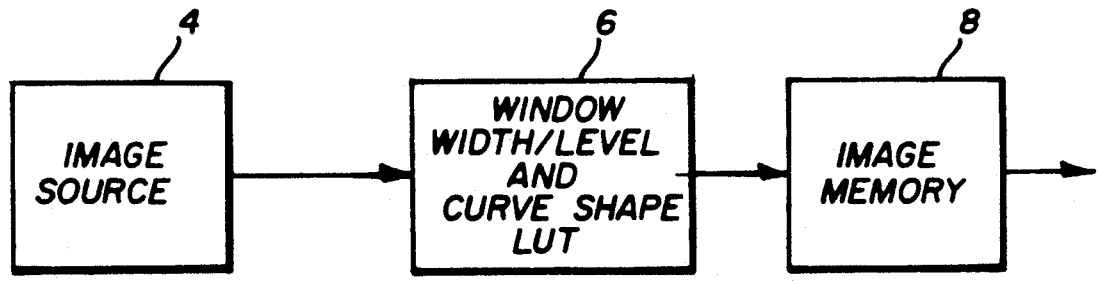
FIG. 3 is a block schematic diagram of a known image processing apparatus.

FIG. 2 graphically illustrates a window width/level transfer function. An input pixel has a total tonal range of 0 to n-bits. However, the region of interest of the input pixel is contained in a narrow tonal range called the window of width w. The window level L is the minimum value of the window. The tonal range of the region of interest (window) is expanded to the complete tonal range of the display device by window width/level LUT 22. Thus, the output pixel will have a tonal range of 0 to n-bits. For example, if both the input and the output pixel has an 8-bit length, the pixel can have a code value (CV) of 0 to 255. Since the window width is a range of values less than 0-255, say 80, LUT 22 expands the 80 code value range to the full tonal range value of 256.

The window width/level processed image is stored in buffer image memory 24. The window width/level processed image stored in memory 24 is transmitted over VSB bus 32 to curve shape LUT 28. Due to the non-linear shape of the display curve (see FIG. 1), LUT 28 transforms an 8-bit pixel received from memory 24 to a 12-bit curve shape processed pixel. Image size circuit 30 processes the curve shape processed image according to enlargement or reduction algorithms to fit the image to the space allocated to it on the hard copy print produced by laser printer 10.

Figure 4:
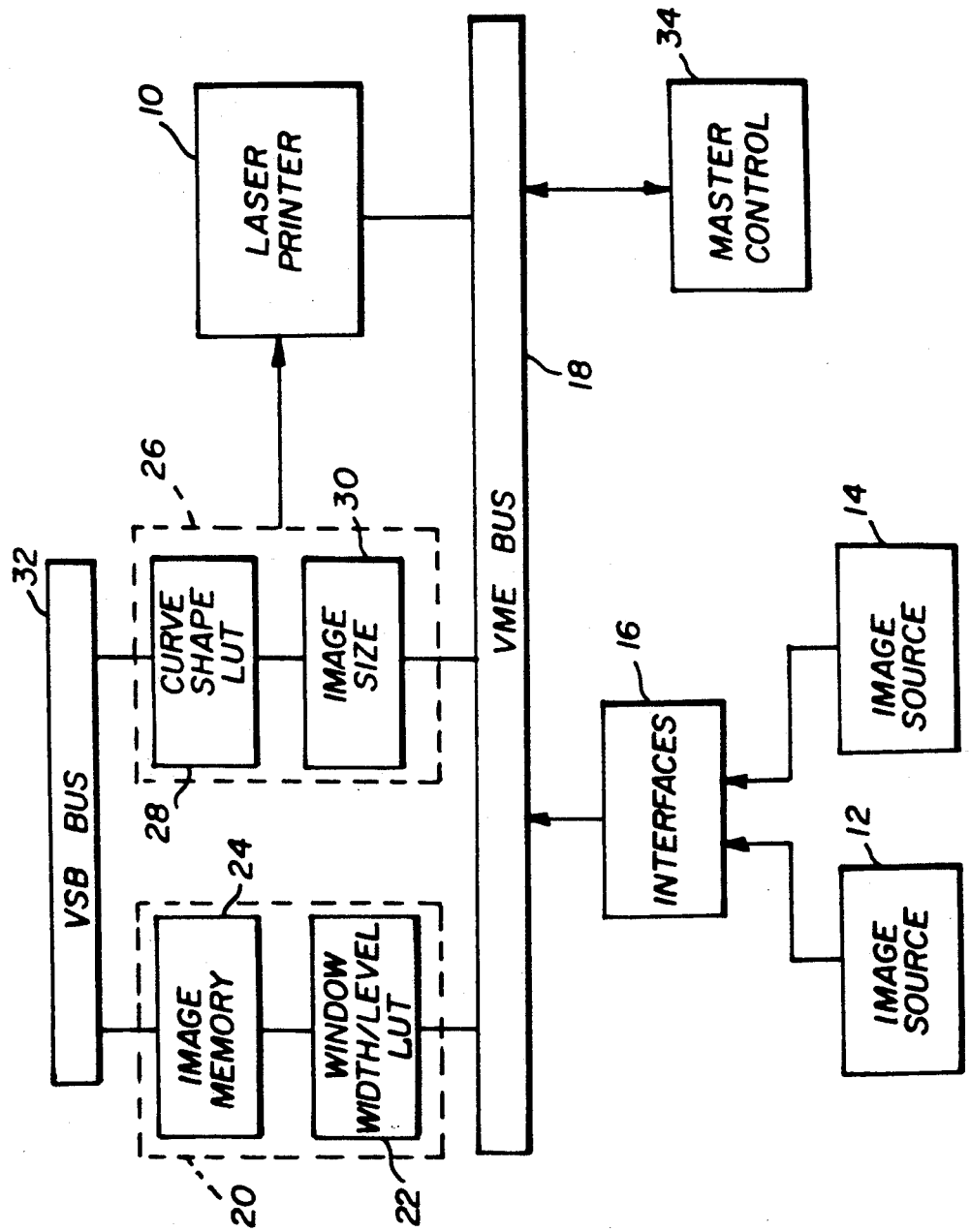
FIG. 4 is a block schematic diagram of an image processing apparatus according to the present invention.

Master control 34 includes a microprocessor and other control circuitry to control the operation of the apparatus of FIG. 4.

According to a feature of the present invention, window width/level LUT 22 and image memory 24 are software configurable to handle images of different pixel bit lengths. Because different medical diagnostic imaging modalities produce images which are digitized to 8-bit or 12-bit pixel lengths, it is desirable that a single laser printer 10 be able to print both 8-bit and 12-bit images. It is also desirable that the image processing circuitry be capable of achieving higher performance and higher image transfer rates when images having smaller bit length pixels are to be printed. According to the present invention, memory 24 and LUT 22 are operable to handle images of both 8-bit and 9- to 12-bit pixel length under software control. Moreover, when 8-bit pixel images are processed, several pixels are processed simultaneously.

Figure 5:
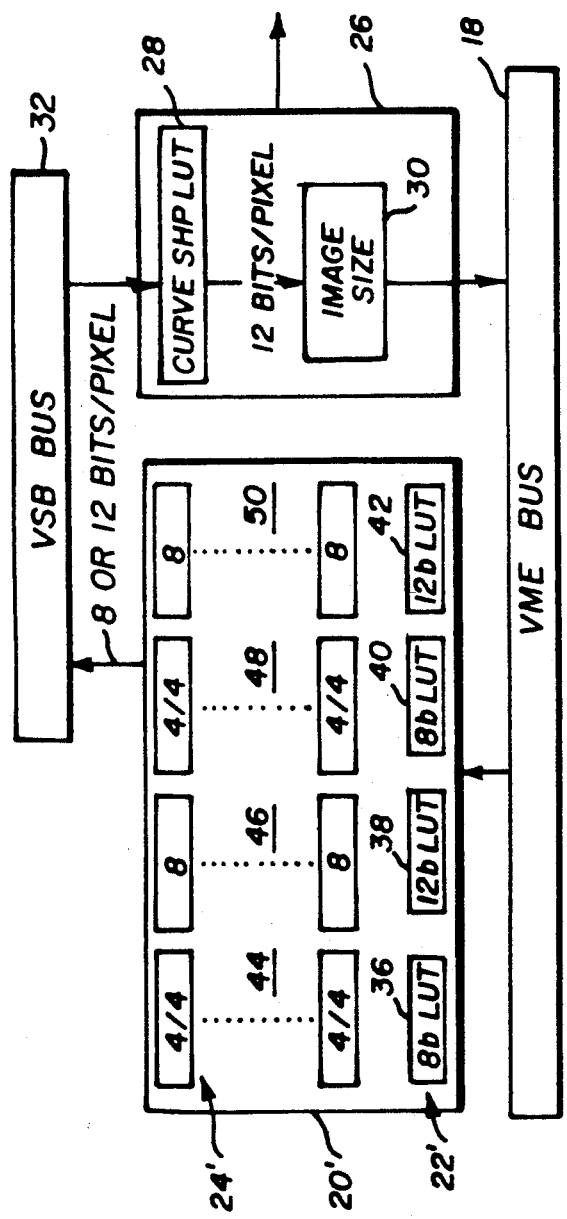
FIG. 5 is a block schematic diagram of the look-up table and memory configuration of the apparatus of FIG. 4.

Referring now to FIG. 5, there is shown an embodiment of the present invention. As shown, circuit board 20' includes window width/level look-up table 22' having LUTs 36, 38, 40 and 42. LUTs 36 and 40 are 8-bit look-up tables and LUTs 38 and 42 are 12-bit look-up tables. Board 20' also includes buffer image memory 24' having banks 44, 46, 48 and 50 of 8-bit memory units. The size of memory units 44, 46, 48 and 50 will vary with the size of image to be processed.

In the embodiment of FIGS. 4 and 5, since VME bus 18 is capable of transmitting 32 bits of data simultaneously, if the image pixel size is 8-bits, bus 18 can transmit four 8-bit pixels simultaneously. Consequently, LUT 22' and memory 24' can process and store four 8-bit pixels simultaneously. In such case, LUTs 38 and 42 are configured as 8-bit look-up tables. Thus, four 8-bit pixels will be simultaneously processed by 8-bit LUTs 36, 38, 40 and 42 and subsequently stored as window width/level processed 8-bit pixels in 8-bit memory banks 44, 46, 48 and 50, respectively.

If two 12-bit pixel images are transmitted simultaneously over bus 18, window width/level processing circuit 22' is configured as follows: LUTs 36 and 40 are not used and LUTs 38 and 42 are 12-bit look-up tables which simultaneously process two 12-bit pixels for window width and level. Memory bank pairs 44, 46 and 48, 50 are configured to store 12-bit pixels, so that two 12-bit processed pixels are stored simultaneously in memory 24'.

8-bit LUTs 36 and 40 shown in FIG. 5, can be software configured to handle any size pixel between 1 and 8-bits, inclusive. Similarly, 12-bit LUTs 38 and 42 can be software configured to handle any size pixel between 1 and 12-bits, inclusive. LUTs 38 and 42 can also store combined window width/level and curve shape look-up tables.

Either 8 or 12-bit pixel images are transmitted over VSB bus 32 to curve shape look-up table 28. LUT 28 transforms the 8 or 12-bit input pixel to a 12-bit output pixel which is further processed by image size circuit 30 before being printed by printer 10. Printer 10 is preferably a 12-bit per pixel printer.

Figure 6:
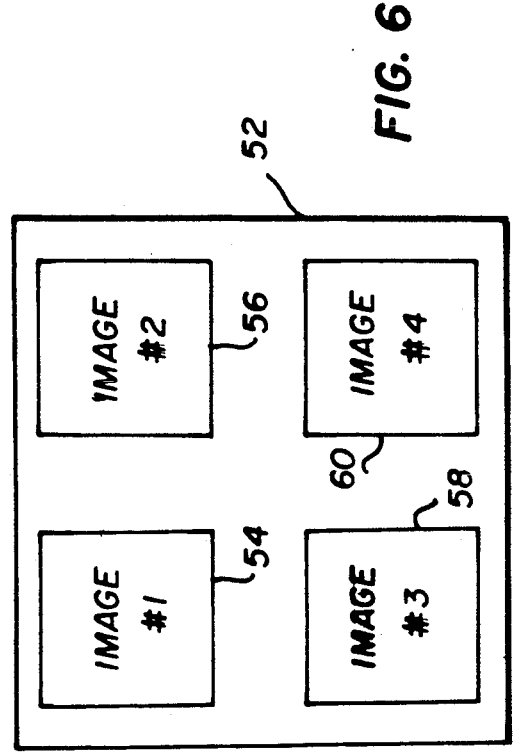
FIG. 6 is a diagrammatic showing of a hard copy having a plurality of images.
Figure 7A:
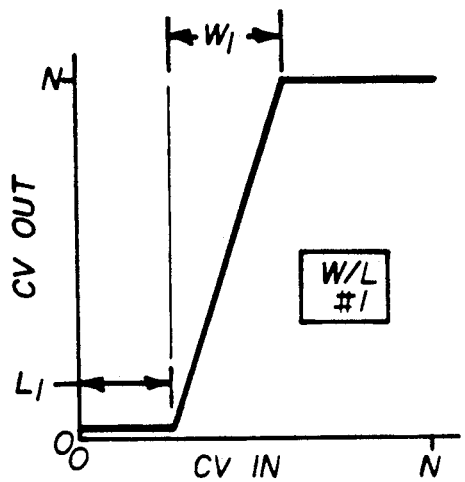
FIGS. 7A-7D are graphs illustrating different window width/level processing look-up tables for the images of the hard copy of FIG. 6.
Figure 7B:
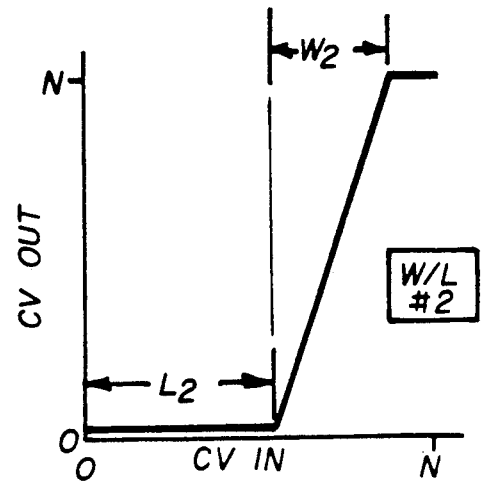
Figure 7C:
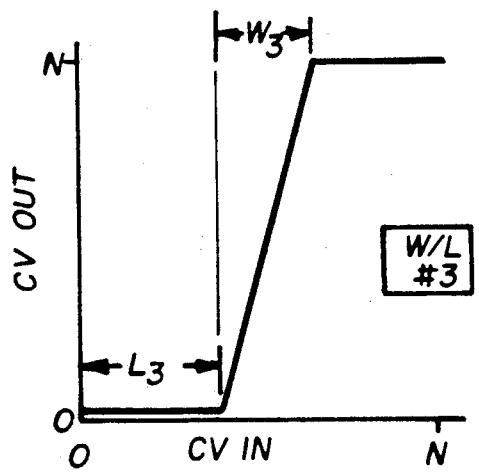
Figure 7D:
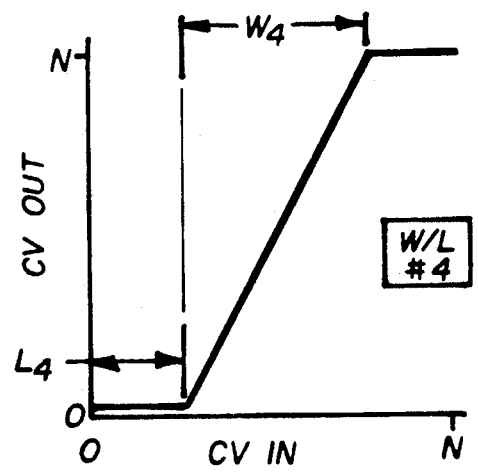

Referring now to FIGS. 6 and 7A-7D, there will be described the operation of the apparatus of FIG. 4 in producing a multi-image page. As illustrated in FIG. 6, laser printer 10 (FIG. 4) produces a hard copy page 52 having images 54, 56, 58 and 60 respectively labelled as images 1-4. As illustrated in FIG. 7A-7D, each of images 1-4 has a different window width/level processing characteristic. As shown in FIG. 7A, image number 1 has a window level $L_1$ and a window width $w_1$; as shown in FIG. 7B, image number 2 has a window level $L_2$ and a window width $w_2$; as shown in FIG. 7C, image number 3 has a window level $L_3$ and a window width $w_3$; and as shown in FIG. 7D, image number 4 has a window level $L_4$ and a window width $w_4$. Since curve shape is determined by the tonal characteristics of the display device upon which the images to be printed are displayed, the curve shape is normally the same for all the images of a printed page. However, as illustrated in FIG. 7A-7D, specific images within a page can have window width and level characteristics which change from image to image.

According to a feature of the invention shown in FIGS. 4 and 5, window width/level image processing is effected by look-up table 22 before the image is stored in buffer image memory 24. This permits changing of the window width/level tables for each image before it is stored in memory 24. Where the window width/level processing is an 8-bit to 8-bit transformation, storage of 8-bit processed pixels in memory 24, more efficiently utilizes memory space, cutting cost and substantially improving performance of the memory. By effecting curve shape image processing in the output data path of buffer image memory 24, page 52 can be printed more efficiently without rapid changing of the look-up table to accommodate changing window width/level processing for different images to be printed on the same page.

According to another feature of the invention, LUT 22 can be configured to store a combined window width/level and curve shape look-up table to allow changing of curve shape within the images of a page.

Figure 8:
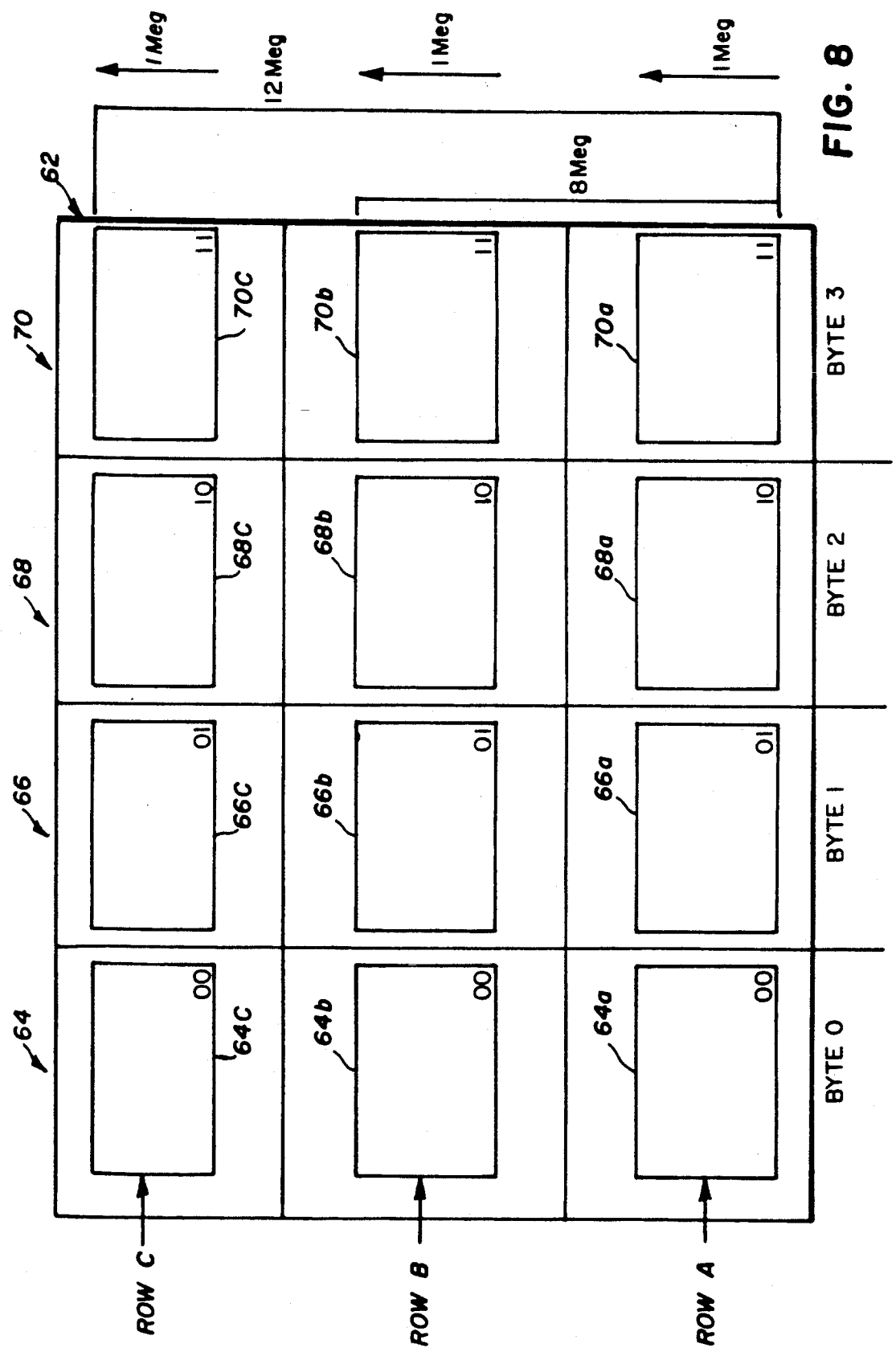
FIG. 8 is a diagrammatic view of a memory board which may be used in the image memory of the apparatus of FIG. 4.

Referring now to FIG. 8, there will be described another feature of the present invention. As shown, memory board 62 is configured to store four 8-bit pixels simultaneously. To that end, board 62 includes four banks 64, 66, 68 and 70 of megabyte memory modules, such as modules 64a, 66a, 68a and 70a arrayed in row a; modules 64b, 66b, 68b, and 70b arrayed in row b; and module 64c, 66c, 68c, and 70c arrayed in row c. Each megabyte module may comprise, for example, 8 megabit dynamic random access memory (DRAM) chips. A single memory board may be used for different size memories. Thus, an 8 megabyte memory board includes memory modules in rows a and b, whereas a 12 megabyte memory board also includes memory modules in row c.

INDUSTRIAL APPLICABILITY AND ADVANTAGES

The present invention is useful for processing images in a continuous tone laser printer of the type employed to produce a hard copy of medical diagnostic digital images. The invention has several advantages. Buffer image memory size is reduced resulting in cost savings in memory. Individual images within a page may be processed for different window width/level characteristics without changing curve shape processing of the same images. A further advantage is that the memory can operate in either an 8-bit, or a 12-bit mode thus allowing a multiple input system configuration to accommodate several pixel bit depths. This flexibility is also useful in that a single board can be manufactured for several different customer applications.

Another advantage of this configuration is that data transfers to the board can achieve higher performance by moving 4-8-bit pixels or 2-9 to 12-bit pixels simultaneously. This takes full advantage of the bus bandwidth, especially in the case of 8-bit pixels.

The invention have been described in detail with particular reference to a preferred embodiment thereof, but it will be understood that variations and modifications can be effected within the spirit and scope of the invention.

What is claimed is:

1. Digital image processing apparatus comprising:

first means for processing a digital image signal for window width and level to produce a window processed digital image signal;

memory means for storing said window processed digital image signal; and second means for processing said window processed digital image signal from said memory means for curve shape to produce a window width/level and curve shape processed digital image signal.

2. The apparatus of claim 1 including a printer for producing a hard copy of said window width/level and curve shape processed digital image signal.

3. The apparatus of claim 2 wherein said printer is a laser printer.

4. The apparatus of claim 1 wherein said first processing means selectively processes, (a) an n-bit digital image signal to produce an n-bit window processed digital image signal, or (b) an m-bit digital image signal to produce an m-bit window processed digital image signal, and wherein said memory means selectively stores said n-bit window processed digital image signal or said m-bit window processed digital image signal, where m and n are positive integers and m>n.

5. The apparatus of claim 4 wherein n=8 and m=12.

6. The apparatus of claim 4 wherein said second processing means processes an n-bit window processed digital image signal to produce an m-bit window width/level and curve shape processed digital image signal.

7. The apparatus of claim 1 wherein said first processing means selectively processes, (a) up to four n-bit digital image signals simultaneously to produce up to four n-bit processed digital image signals, or (b) up to two m-bit digital image signals to produce up to two m-bit processed digital image signals, and wherein said memory means selectively stores said up to four n-bit processed digital image signals or said up to two m-bit processed digital image signals, where m and n are positive integers and n<m≦2 n.

8. The apparatus of claim 1 wherein said first processing means includes a window width and level look-up table and wherein said second processing means includes a curve shape look-up table.

9. Digital image processing apparatus comprising:

first processing means for selectively processing a digital image signal, either (a) for window width and level, or (b) for window width/level and curve shape to produce a processed digital image signal;

memory means for storing said processed digital image signal; and second processing means, operable only when said first processing means produces a window width/level processed digital image signal, for processing said processed digital image signal from said memory means for curve shape to produce a window width/level and curve shape processed digital image signal.

10. The apparatus of claim 9 including a printer for producing a hard copy of said window width/level and curve shape processed digital image signal.

11. The apparatus of claim 10 wherein said printer is a laser printer.

12. The apparatus of claim 9 wherein said first processing means selectively processes, (a) an n-bit digital image signal to produce an n-bit processed digital image signal, or (b) an m-bit digital image signal to produce an m-bit processed digital image signal, and wherein said memory means selectively stores said n-bit processed digital image signal or said m-bit processed digital image signal, where m and n are positive integers and m>n.

13. The apparatus of claim 12 wherein n=8 and m=12.

14. The apparatus of claim 12 wherein said second processing means processes an n-bit processed digital image signal to produce an m-bit window width/level and curve shape processed digital image signal.

15. The apparatus of claim 9 wherein said first processing means selectively processes, (a) up to four n-bit digital image signals simultaneously, or (b) up to two m-bit digital image signals simultaneously, and wherein said memory means selectively stores said n-bit processed digital image signals or said m-bit processed digital image signals, where m and n are positive integers and n<m≦2 n.

16. The apparatus of claim 9 wherein said first processing means includes either, (a) a window width and level look-up table, or (b) a combined window width/level and curve shape look-up table and wherein said second processing means includes a curve shape look-up table.

17. Digital image processing apparatus comprising:

interface means for receiving an image from an image source and for forming a digital image of n-bit pixels;

a first bus connected to said interface means for simultaneously transmitting from said interface means four n-bit pixels of said digital image;

first look-up-table (LUT) means connected to said first bus means for simultaneously processing, for window width and level, four n bit pixels transmitted by said first bus means, to produce four window width/level processed pixels;

image memory means connected to said look-up-table means for simultaneously storing said four window width/level processed pixels, said image memory means having capacity of said digital image to store a window width/level processed digital image;

second look-up-table (LUT) means for sequentially processing n bit window width/level processed pixels, for curve shape, to produce m-bit window width/level and curve shape processed pixels, where m and n are positive integers and m>n;

second bus means for sequentially transmitting n-bit pixels between said image memory means and second look-up table means; and laser printer means for receiving said m-bit processed pixels from said second look-up-table means and for producing a hard copy of said image from said image source.

18. The apparatus of claim 17 wherein n=8 and m=12;

wherein said first bus means is 32 bits wide and simultaneously transmits four 8-bit pixels, wherein said first LUT means includes four 8-bit LUTs for simultaneously processing four 8-bit pixels of a digital image for window width/level;

wherein said second bus means sequentially transmits 8-bit pixels to said second LUT means; wherein said second LUT means processes individual 8-bit window width/level processed pixels for curve shape to produce 12-bit window/width level and curve shaped processed pixels; and wherein said laser printer produces said hard coy image as a function of said 12-bit pixels from said second LUT means.

* * * * *